Aug. 31, 1926.

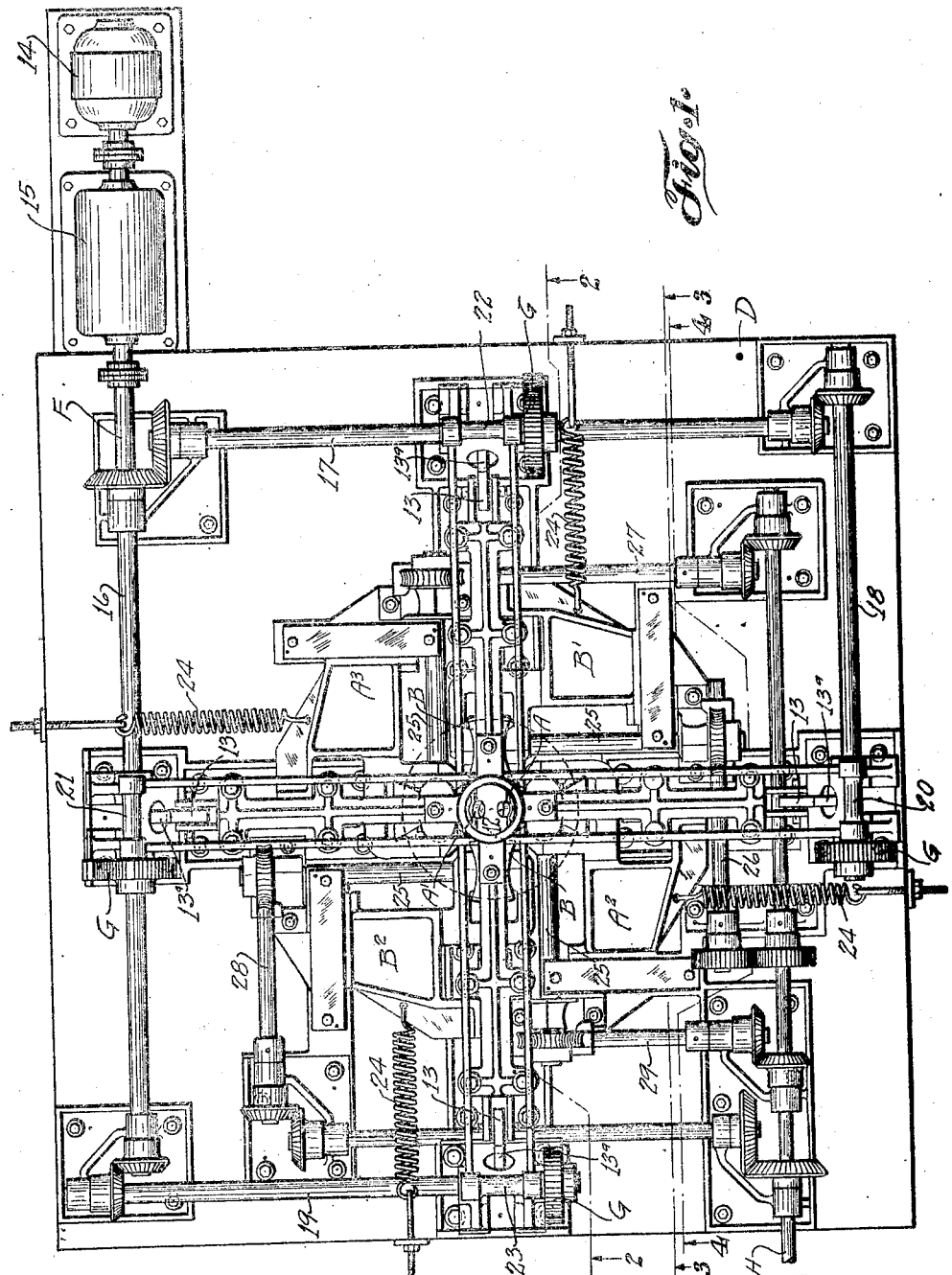

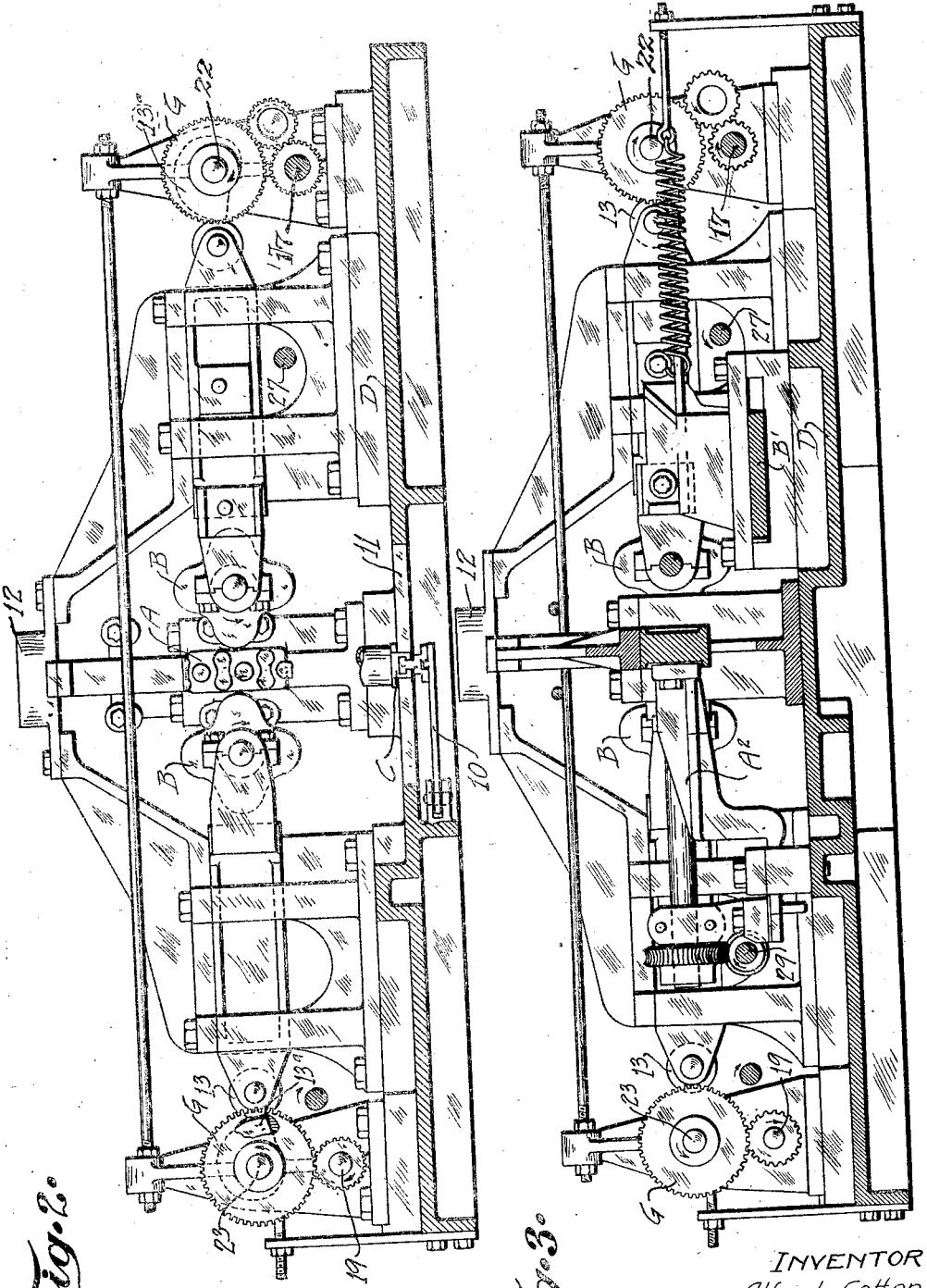

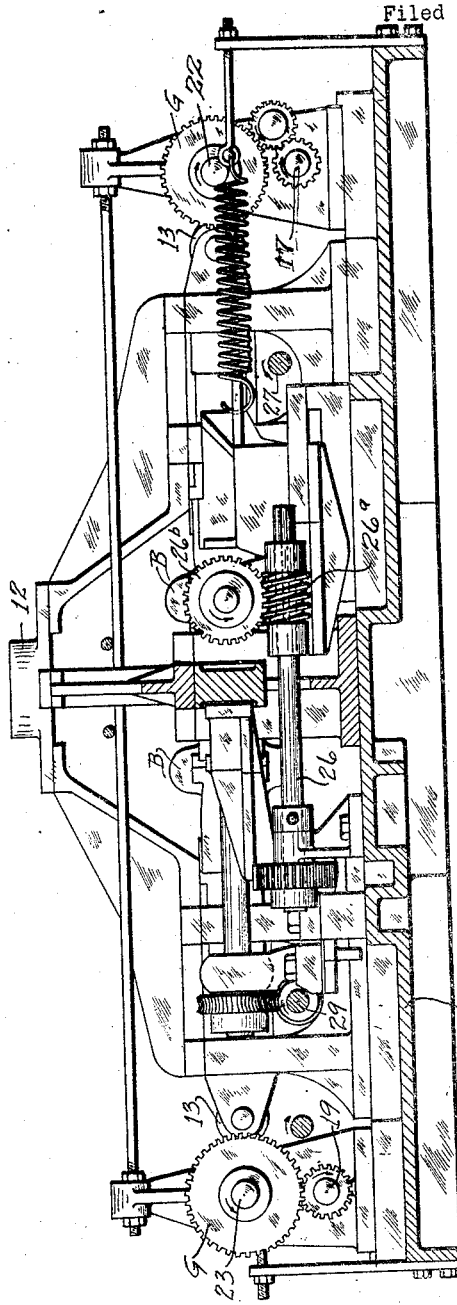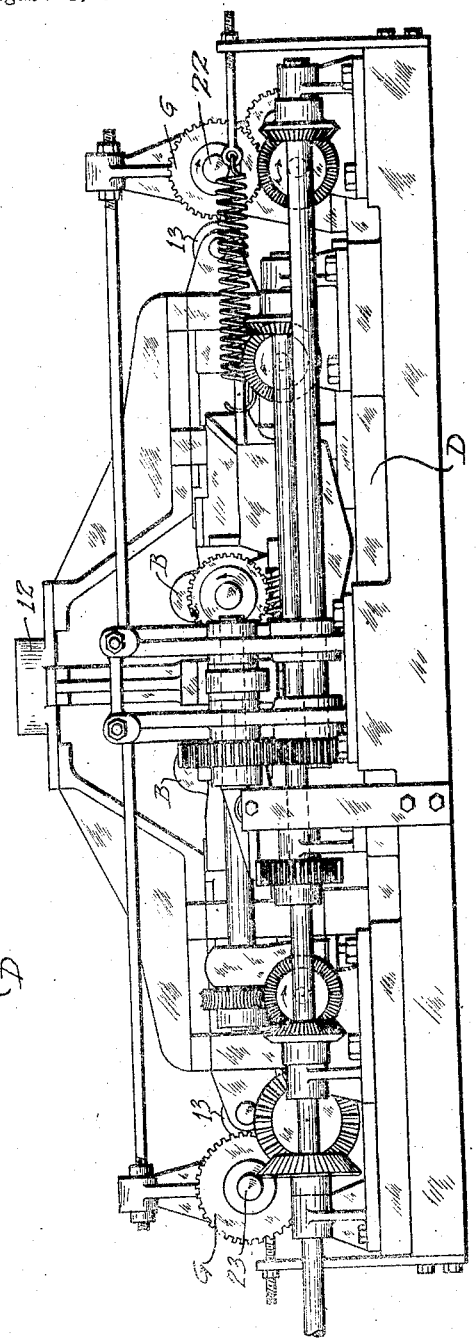

A. COTTON 1,598,058

MACHINE FOR MAKING SECTIONAL HEADERS FOR BOILERS

Filed August 4, 1923   5 Sheets-Sheet 4

INVENTOR
Alfred Cotton.
BY Bakewell & Church
ATTORNEYS

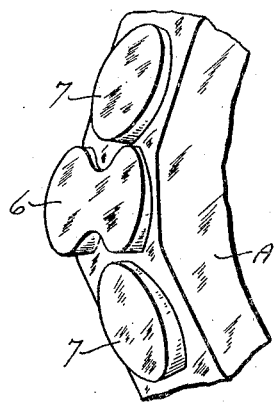
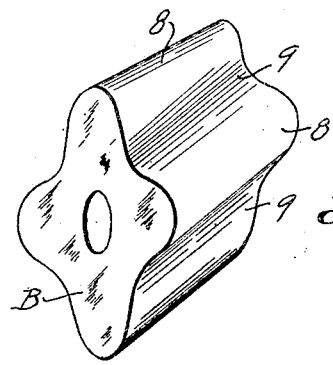
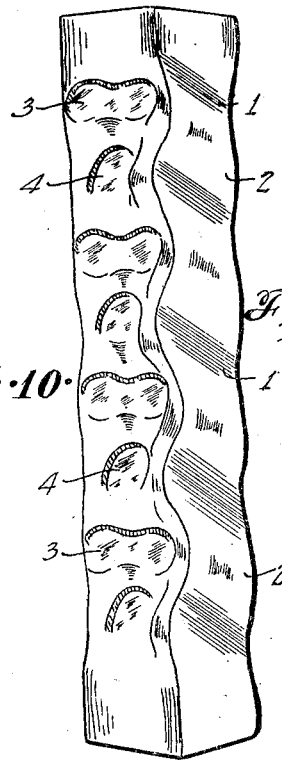
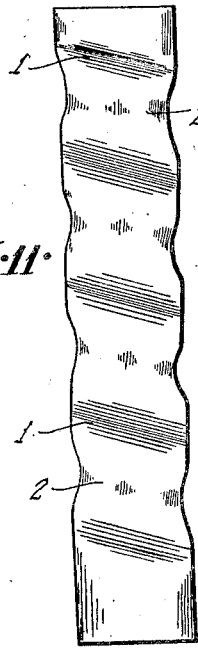
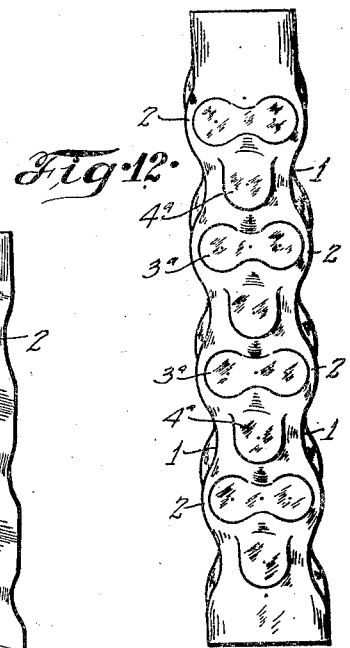

Patented Aug. 31, 1926.

1,598,058

UNITED STATES PATENT OFFICE.

ALFRED COTTON, OF ST. LOUIS, MISSOURI, ASSIGNOR TO HEINE BOILER COMPANY, OF ST. LOUIS, MISSOURI, A CORPORATION OF MISSOURI.

MACHINE FOR MAKING SECTIONAL HEADERS FOR BOILERS.

Application filed August 4, 1923. Serial No. 655,666.

This invention relates to sectional headers for boilers of the type described in my pending application for patent Serial No. 596,432. filed October 23, 1922 (Patent No. 1,565,060, dated Dec. 8, 1925), and has for its main object to provide a practicable machine for producing such a header by a rolling operation.

Briefly described, the header disclosed in my said application consists of a hollow member constructed from a welded or drawn tube of circular or oval shape in cross section that is deformed by pressure applied externally to the front and rear sides and to the lateral side portions of the tube in such a way as to produce a header whose lateral sides have oppositely-disposed valleys and oppositely-disposed ridges arranged in alternate relation, and whose front and rear sides have ridges and valleys arranged in alternate relation with those on the lateral sides of the header.

My present invention consists of a machine of novel construction for producing such a header by a rolling operation. Said machine comprises two pairs of rolls arranged at right angles to each other and disposed symmetrically around a space in which a circular or oval tube is adapted to be arranged in a vertical position, means for moving said rolls inwardly into engagement with the tube, and means for rotating said rolls so as to cause them to deform the tube and feed said tube through the rolls, the means that moves the rolls inwardly into engagement with the tube also being used to move said rolls outwardly out of engagement with the deformed tube. The rolls that act on the front and rear sides of the tube are preferably provided with pressing portions that form flat faces in the front and rear sides of the header that are adapted to have boiler tube holes and hand holes formed therein, and during the deforming operation the parts of the tube that are acted upon by said pressing portions are internally supported by die portions on a collapsible mandrel which is arranged inside of the tube.

Figure 1 of the drawings is a top plan view of my improved machine.

Figs. 2, 3 and 4 are transverse sectional views. taken on the lines 2—2, 3—3 and 4—4 of Fig. 1, looking in the direction indicated by the arrows.

Fig. 5 is a side elevational view of the machine.

Fig. 8 is a perspective view of a portion of the front roll.

Fig. 9 is a perspective view of one of the side rolls.

Fig. 10 is a perspective view of a portion of the header produced in my machine, but having its ends unfinished.

Fig. 11 is a side elevational view of said header; and

Fig. 12 is an elevational view of the rear side of the header.

The drawings which represent the preferred form of my invention illustrate a machine that is adapted to be used for bending or deforming a circular or oval metal tube so as to produce a hollow member of the shape shown in Figs. 10, 11 and 12, which has corrugated lateral sides, each of which is made up of a series of valleys 1 arranged between a series of ridges or outwardly-projecting bulges 2 and disposed diametrically opposite the valleys and ridges on the other lateral side, and front and rear sides, each of which is made up of a series of bulged portions arranged in alternate relation with a series of valleys. the valleys in the front and rear sides of the tube extending transversely of the tube and being of greater length than the width of said bulged portions. Said hollow member is adapted to be used as a sectional boiler header and the valleys and bulged portions that are formed in the front and rear sides of the tube during the operation of constructing the header have flat faces pressed thereon which are adapted to be perforated so as to form holes on the rear side of the header for the tubes of the boiler and hand holes in the front side of the header through which a tool can be inserted to expand the ends of the boiler tubes. When a number of such headers are arranged in operative position in the boiler the oppositely-disposed, bulged portions 2 on the lateral sides of each header project into the valleys 1 on the sides of adjacent headers and the valleys 1 in the sides of each header receive the ridges or bulged portions 2 on the lateral sides of said adjacent headers. The header herein illustrated is adapted to be used in a water tube boiler of the type in which the boiler tubes are arranged in an inclined position, and the headers are arranged in a vertical position, and accordingly, the ridges and valleys in the lateral sides of the header are inclined slightly to the horizontal and the flat faces in the front and rear sides of the header in which the tube and hand holes are formed are disposed at a slight angle to the vertical. As shown in Figs. 10, 11 and 12, the transversely-disposed valleys and the bulges in the front and rear sides of the header are provided with flat faces 4 and 4ª, and 3 and 3ª, respectively, said flat faces being so disposed that when the header is arranged in operative position in the boiler the portions to which the boiler tubes are connected and the portions in which the hand holes are formed will extend at right angles to the longitudinal axis of the boiler tubes.

Figure 6:
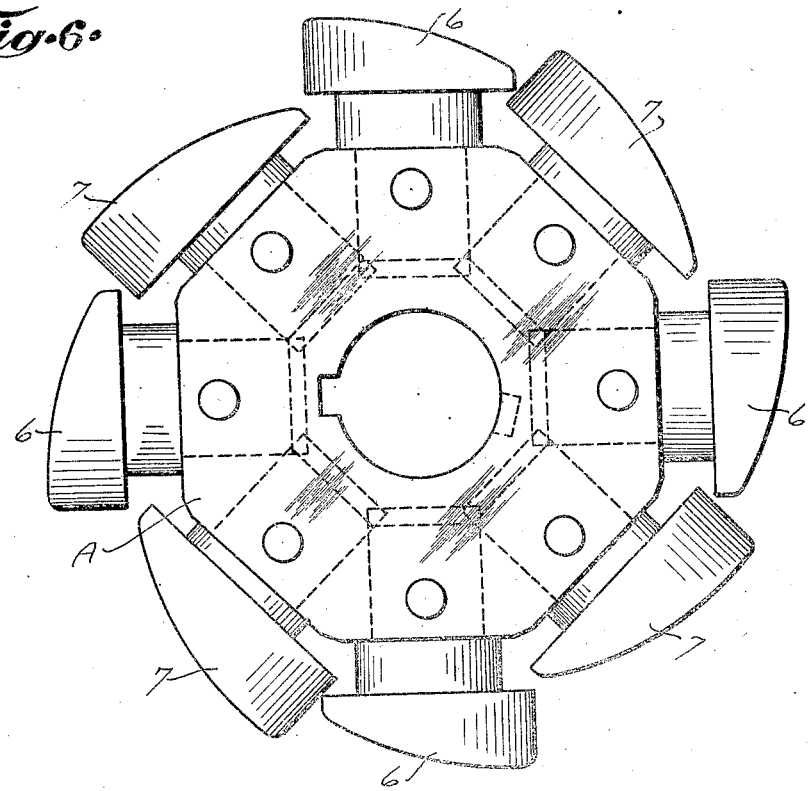
Fig. 6 is a side elevational view of the front roll.
Figure 7:
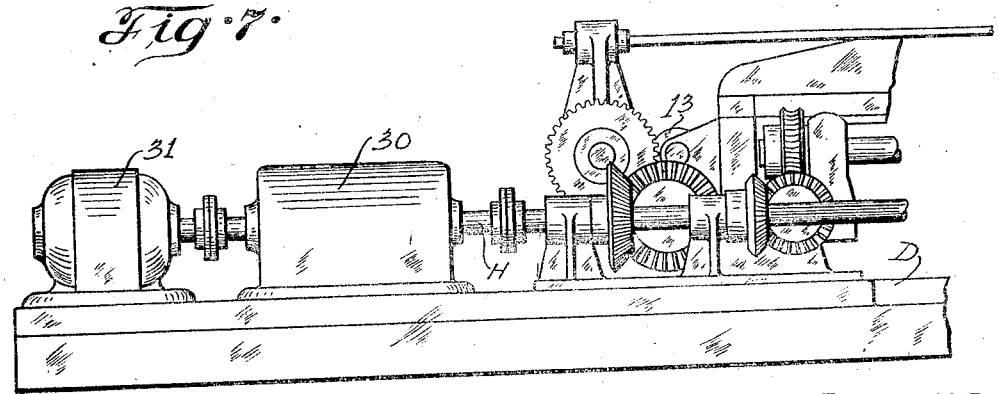
Fig. 7 is a side elevational view of a portion of the machine, showing the driving means for the mechanism that rotates the rolls.

As shown in Fig. 1 of the drawings, my improved machine is provided with one pair of rolls composed of a front roll A and a rear roll A′, each of which is of the form and construction shown in Figs. 6 and 8, and a second set of rolls composed of two side rolls B, each of which is of the form shown in Fig. 9. The front and rear rolls are arranged in opposed relation at opposite sides of a vertical space at the center of the machine in which the tube that is to be deformed is arranged in an upright position and the side rolls B are arranged in opposed relation at opposite sides of said space and at right angles to the front and rear rolls. Each of the front and rear rolls is provided with a set of relatively wide pressing portions 6 that form the wide, flat faces 3 and 3ª in the front and rear sides of the tube, and a set of narrow pressing portions 7 that form the flat faces 4 and 4ª in the front and rear sides of the tube, said pressing portions being arranged in alternate relation, as shown in Fig. 8. Each of the side rolls B is provided with four longitudinally-disposed ribs 8 and four recesses 9 that lie between the ribs 8, said ribs and recesses being inclined slightly to the horizontal. The four rolls are so disposed that when they are moved inwardly towards the tube that is to be deformed the two opposed ribs 8 on the side rolls B engage diametrically opposed portions in the lateral sides of the tube and press said opposed portions inwardly, and the pressing portions on the front and rear rolls which are then presented towards the tube cause portions in the front and rear sides of the tube to be pressed inwardly. The four rolls are then given a quarter turn forwardly, so as to cause the next pair of opposed ribs 8 on the side rolls to press other diametrically opposed portions in the lateral sides of the tube inwardly, and the next pair of opposed pressing portions on the front and rear rolls to press other portions in the front and rear sides of the tube inwardly. During these operations the portions of the tube that lie between the inwardly-pressed portions are subjected to pressure which causes said portions to bulge outwardly, thereby forming the ridges previously referred to. Thereafter, the forward rotary movement of the four rolls is continued so as to feed the tube through the rolls and produce diametrically-opposed alternately-arranged valleys and ridges on the lateral sides of the tube that are disposed at substantially right angles to and in staggered relation to alternately-arranged series of valleys and ridges on the front and rear sides of the tube, the pressing portions 6 and 7 on the front and rear rolls causing flat faces 3, 3ª, 4 and 4ª to be formed in the front and rear sides of the tube. During the deforming operation the tube is supported internally at certain points by an internal mandrel C arranged inside of the tube and provided with die portions that co-operate with the pressing portions 6 and 7 on the front and rear rolls, said mandrel being of such form that it will not interfere with the inward bending of the opposed portions in the lateral sides of the tube and being of such construction that it can be collapsed and withdrawn from the tube at the completion of the bending operation. One form of mandrel that may be used is the mandrel described in my U. S. Patent No. 1,565,061, dated December 8, 1925, said mandrel being provided on its front and rear sides with alternately-arranged series of wide and narrow die portions that have flat faces of suitable shape to co-operate with the pressing portions on the front and rear rolls to produce flat tube seat portions and hand hole plate seat portions on the rear and front sides of the tube that is being deformed. At the beginning of the deforming operation the mandrel C is supported in a vertical position at the center of the machine by a mandrel support 10, as shown in Fig. 2, and after the rolls have been moved inwardly to cause the co-operating portions on said rolls to press diametrically opposed parts of the tube inwardly, said mandrel support 10 is swung laterally into an inoperative position so as not to interfere with the movement of the tube and mandrel downwardly through the center hole 11 in the base plate D of the machine. Due to the shape or form of the crimps in the tube, the mandrel will be interlocked with the tube and will move with the tube as a single unit after the first crimp has been formed in the lower end portion of the tube. If desired, means can be used to feed the mandrel so as to insure said mandrel moving in synchronism with the rolls. The specific construction of the rolls is immaterial, but in order that the shape or form of the header produced in the machine may be modified in some respects, as, for example, varying the shape, angle or area of the flat faces on the front and rear sides of the header, the pressing portions 6 and 7 of the front and rear rolls are constructed so as to form separate units that are detachably connected to the rolls, as shown in Fig. 6.

The supporting structure of the machine comprises a horizontally disposed base plate D, previously mentioned, provided with a center hole 11 through which said tube is fed downwardly, a horizontally-disposed sleeve or annular member 12 arranged above the base plate so as to serve as a guide for the tube, horizontally-disposed reciprocating carriers A², A³, B' and B² for the front and rear rolls and for the two side rolls, respectively, a mechanism for reciprocating said carriers to move the rolls into and out of engagement with the tube, and a mechanism for rotating said rolls. The roll carriers are of similar construction and each consists of a slide reciprocatingly mounted in stationary guides on the base plate D and provided at its outer end with a roller 13, and the mechanism for reciprocating said roll carriers consists of four horizontally-disposed cam shafts arranged at right angles to each other in bearings on the base plate D and operatively connected with a driving means that turns said cam shafts forwardly to move the deforming rolls into engagement with the tube and rearwardly to cause said deforming rolls to move out of engagement with the tube. In the machine herein shown the drive shaft of the driving means just referred to is designated by the reference character F and is connected with a reversible electric motor 14 by a speed reduction gearing 15, as shown in Fig. 1. Two right-angularly-disposed counter shafts 16 and 17 are operatively connected with said drive shaft and with two other right-angularly-disposed counter shafts 18 and 19, as shown in Fig. 1, the connection between said shafts being such that when the drive shaft revolves in one direction, for example, clockwise direction, said counter shafts will cause the cam shafts with which they are associated to revolve in clockwise direction, and when said drive shaft revolves in anti-clockwise direction, said cam shafts will revolve in anti-clockwise direction. The above-mentioned counter shafts are journaled in bearings on the base plate D and are connected by gearing with four short cam shafts 20, 21, 22 and 23 that are associated, respectively, with the carriers for the front and rear rolls and the carriers for the two side rolls. The particular form of gearing that is used is immaterial, but in the machine herein shown each of the said cam shafts is provided at one end with a large gear G that is driven by one or more pinions from the counter shaft with which the cam shaft is associated. Each of the various cam shafts is provided with a cam 13ª that bears against the roller 13 on the roll carrier which said cam shaft controls, and coiled springs 24 are connected to the roll carriers and to brackets on the frame of the machine, so as to hold the cams 13ª in engagement with their cooperating rollers 13 and move the roll carriers outwardly at the completion of the deforming operation.

The mechanism that I have herein illustrated for driving the rolls A, A' and B consists of shafts 25 connected to said rolls and rotatably mounted in bearings on the roll carriers, a drive shaft H operatively connected with angularly-disposed, rotatable counter shafts on the bed plate, and gearing between said counter shafts and said roll shafts constructed in such a way as to provide for the reciprocating movement of the roll carriers. In the machine herein shown four horizontally-disposed counter shafts 26, 27, 28 and 29 are mounted in bearings on the base plate of the machine and are operatively connected together and with the drive shaft H which is connected by a speed reduction gearing 30 with a reversible electric motor 31. The counter shaft 26 is provided with a worm 26ª, shown in Fig. 4, that meshes with a worm gear 26ᵇ on the shaft of one of the side rolls B, which worm 26ª is rotatably mounted in bearings on the roll carrier B' and is connected by a spline or key-way to the counter shaft 26 so as to permit said worm to move longitudinally of the counter shaft 26 when the side roll carrier B' is moved inwardly to carry the roll thereon into engagement with the tube and outwardly to disengage said roll from the tube. The other counter shafts 27, 28 and 29 are connected with their co-operating roll shafts in a similar manner, thereby producing a mechanism for rotating the deforming rolls that provides for the reciprocating movement of the roll carriers.

Assuming that the rolls are separated and that the mandrel is arranged in operative position at the center of the machine, a heated tube of cylindrical or oval shape in cross section is telescoped over said mandrel, and the drive shaft F is then revolved in a direction to cause the cams 13ª to move the roll carriers inwardly towards the longitudinal axis of the tube, thus forming two opposed crimps in the lower end portions of the lateral sides of the tube and flat faces in the front and rear sides of the tube in proximity to said crimps. The drive shaft F is then stopped and the drive shaft H is set in operation so as to cause the rolls A, A' and B to revolve, whereupon the tube will be deformed progressively into the shape shown in Figs. 10, 11 and 12 and fed downwardly through the center opening in the bed plate of the machine. After the tube has been deformed the mandrel C is collapsed and withdrawn from the tube. A machine of the kind above described is of simple design, it requires less power to operate it than the machines used to produce conventional serpentine boiler headers, and it enables sectional boiler headers to be produced rapidly with only a few operations.

Having thus described my invention, what I claim as new and desire to secure by Letters Patent is:

1. A machine for deforming a tube so as to produce a sectional header of the kind described, comprising two sets of right-angularly-disposed rolls having co-operating portions disposed so as to form diametrically-opposed inwardly-pressed portions and outwardly-bulged portions in the lateral sides of the tube and also flat faces in the front and rear sides of the tube.

2. A machine for the purpose described, comprising two sets of rolls adapted to be separated so as to permit a tube to be introduced between same, means for moving said rolls inwardly towards the longitudinal center of said tube, means for rotating said rolls, and co-operating portions on said rolls arranged so as to form diametrically-opposed ridges and diametrically-opposed valleys in the lateral sides of the tube and faces in the front and rear sides of the tube that are adapted to have tube holes and hand holes formed therein.

3. A machine for the purpose described, comprising sets of rolls arranged in opposed relation and adapted to have a tube arranged between same, means for moving said rolls inwardly towards the longitudinal center of the tube, co-operating means on said rolls that press diametrically opposed portions in the lateral sides and in the front and rear sides of the tube inwardly and cause intermediate portions in the lateral sides and in the front and rear sides of the tube to bulge outwardly, operating shafts for said rolls, and a mechanism for revolving said shafts constructed so as to provide for the inward and outward movement of said rolls relatively to the tube.

4. A machine for the purpose described, comprising a pair of side rolls arranged in opposed relation and adapted to have a tube positioned between same, opposed front and rear rolls arranged at an angle to said side rolls, and co-operating portions on the rolls of said respective sets disposed so as to convert said tube into a sectional header for boilers having lateral sides made up of diametrically-opposed valleys that bulge inwardly and diametrically-opposed ridges that bulge outwardly, and front and rear sides made up of alternately-arranged series of valleys and ridges disposed in staggered relation with those on the lateral sides of the header.

5. A machine for the purpose described, comprising opposed side rolls between which a tube is adapted to be positioned, opposed front and rear rolls arranged at right angles to said side rolls, a mandrel arranged inside of the tube, means for simultaneously moving all of said rolls inwardly towards the longitudinal axis of the tube, means for rotating said rolls to deform the tube progressively, co-operating portions on said side rolls disposed so as to form diametrically-opposed valleys and diametrically-opposed ridges in the lateral sides of the tube, and co-operating portions on said mandrel and on said front and rear rolls that form flat, angularly-disposed faces in the front and rear sides of the tube that are adapted to have tube holes and hand holes formed therein.

6. A machine for the purpose described, comprising side rolls between which a tube is adapted to be positioned, opposed front and rear rolls arranged at right angles to said side rolls, a mandrel arranged inside of the tube for internally supporting portions in the front and rear sides of the tube during the deforming operation, means for causing said rolls to move inwardly simultaneously towards the longitudinal center of the tube, co-operating portions on said side rolls disposed so as to form diametrically-opposed valleys and diametrically-opposed ridges in the lateral sides of the tube, means for rotating said rolls to feed the tube between the rolls, and pressing portions on the front and rear rolls that co-operate with said mandrel to form alternately-arranged series of wide and narrow, flat faces in the front and rear sides of the tube in which tube holes and hand holes can be formed.

7. A machine for the purpose described, comprising a base plate provided with a center space in which a tube is adapted to be arranged in an upright position, roll carriers reciprocatingly mounted on said base plate and provided with two sets of right-angularly-disposed rolls that are adapted to form inwardly-pressed portion and outwardly-bulged portions in adjacent sections of the tube, means for moving said carriers towards and away from the longitudinal center of the tube, and mechanism for rotating said rolls comprising a driving means carried by the base plate, and shafts on said rolls connected with said driving means by gearing comprising elements that move with the carriers.

8. A machine for the purpose described, comprising a base plate, two sets of right-angularly-disposed rolls that are adapted to crimp a tube which is positioned between said rolls, carriers for said rolls reciprocatingly mounted on said base plate, mechanism for moving all of said carriers simultaneously towards the longitudinal center of the tube, shafts connected to said rolls, and a means for rotating said shafts comprising elements carried by the base plate, and co-operating intermeshing elements that move with said carriers.

9. A machine for the purpose described, comprising corrugated side rolls adapted to have a tube positioned between same, front and rear rolls arranged at right angles to said side rolls, shafts connected to said rolls and projecting outwardly in four different directions, reciprocating carriers in which said rolls and shafts are journaled, means for simultaneously moving said carriers in a direction to cause the rolls thereon to act on the tube simultaneously, and means arranged at the outer ends of the roll shafts for driving same constructed in such a way as to provide for the movement of the carriers towards and away from the center line of the tube.

10. A machine for the purpose described, comprising a base plate provided with a center opening, four right-angularly-disposed carriers reciprocatingly mounted on said base plate and each provided at its inner end with a deforming roll that is adapted to act on a vertically-disposed tube and deform same progressively and feed it downwardly through the center opening of the base plate, means for enabling said carriers to be moved inwardly towards the longitudinal axis of the tube or outwardly away from the tube, and means for rotating said rolls after they have been moved into engagement with the tube.

11. A machine for the purpose described, comprising a base plate provided with a center opening, four right-angularly-disposed carriers slidingly mounted on said base plate and adapted to be moved towards and away from said center opening, rolls on said carriers provided with co-operating portions for forming alternately-arranged series of valleys and ridges in opposed sections of a tube that is positioned between said rolls, a mandrel adapted to be arranged inside of the tube and provided with portions that internally support parts of the tube on which some of said rolls act, a driving mechanism for said rolls comprising rotatable shafts mounted in bearings on the base plate, worms splined to said shafts and journaled in bearings on the roll carriers, and shafts connected to said rolls and provided with worm gears that mesh with said worms.

ALFRED COTTON.